March 27, 1951         J. MILLER, SR         2,546,947
SAW WITH DETACHABLE CUTTING EDGE
Filed Sept. 4, 1948
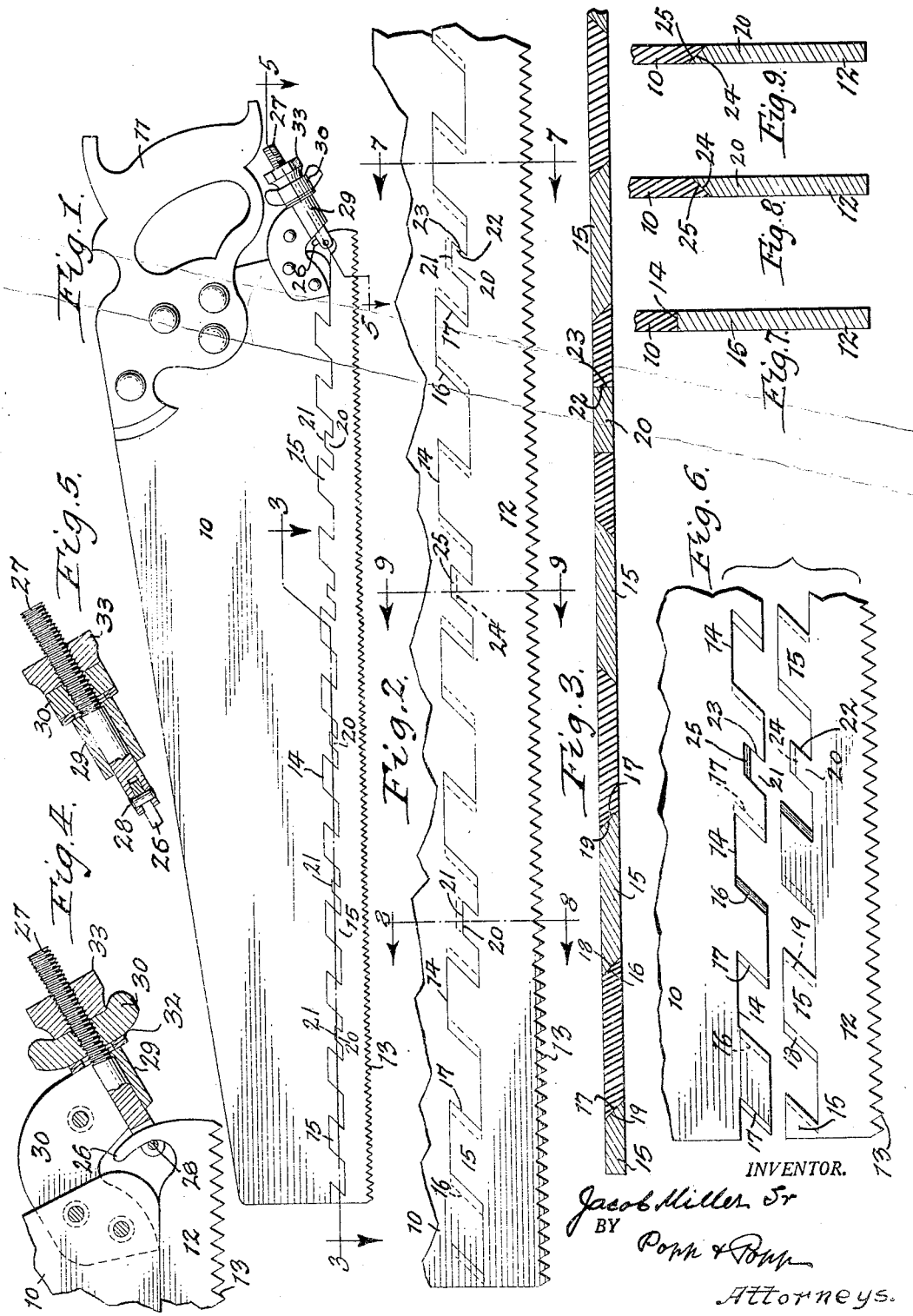
INVENTOR.
Jacob Miller Sr
BY Popp & Popp
Attorneys.

Patented Mar. 27, 1951

2,546,947

UNITED STATES PATENT OFFICE 2,546,947

SAW WITH DETACHABLE CUTTING EDGE

Jacob Miller, Sr., West Falls, N. Y.; Adolf Miller and Jacob Miller executors of said Jacob Miller, Sr., deceased Application September 4, 1948, Serial No. 47,887

2 Claims. (Cl. 143—139)

This invention relates to a saw and more particularly to a hand saw having a body and a separate blade which are detachably connected so that the blade when dull can be replaced by a sharp one and thus expedite the work in hand.

It is the object of this invention to provide a saw of this character which is very simple in construction and efficient in operation and which not only holds the blade in its correct operative position but also permits the same to be quickly changed for another blade in case the one in use becomes dull or is broken or a saw of different teeth is required.

In the accompany drawing:

Fig. 1 is a side elevation of a hand saw constructed in accordance with this invention.

Fig. 2 is a fragmentary side elevation of the lower part of the saw body and a part of the saw blade, on an enlarged scale.

Fig. 3 is a fragmentary horizontal section, on an enlarged scale, taken on line 3—3, Fig. 1.

Fig. 4 is a fragmentary vertical longitudinal section, on an enlarged scale, of the means for detachably connecting the blade of the saw with the body thereof.

Fig. 5 is a horizontal section, on an enlarged scale, taken on line 5—5, Fig. 1.

Fig. 6 is a fragmentary side elevation of the lower part of the saw body and a part of the saw blade in a separated position.

Figs. 7, 8 and 9 are vertical cross sections, on an enlarged scale, taken on the correspondingly numbered lines in Fig. 2.

In the following description similar characters of reference indicate like parts in the several figures of the drawings.

The numeral 10 represents the body of the saw which consists of a thin plate of steel or the like and which is provided at its rear end with a handle 11 whereby the same is moved back and forth during the operation of severing an article.

Below the lower edge of this body is arranged a saw blade 12 which is detachably connected with the saw body and provided at its lower edge with a longitudinal row of teeth 13 whereby the cutting effect is produced on the article to be sawed. This blade is preferably of the same thickness as the body of the saw so that when the blade and body are assembled the opposite sides of the same are flush and capable of passing back and forth freely through the kerf which is being cut in the same manner as a saw in which the blade and body are made integrally.

The means whereby this blade and saw body are detachably connected in accordance with this invention are constructed as follows:

On its lower edge the saw body is provided with a longitudinal row of coupling notches 14 each of which is adapted to receive one of a longitudinal row of coupling lugs 15 arranged on the upper edge of the saw blade.

Each of these notches has the upright front and rear edges 16, 17 bevelled transversely relative to the plane of the saw body and the upright front and rear edges 18, 19 of the saw blade lugs 15 which engage these notches are likewise bevelled transversely.

The inclination of the co-operating bevelled upright edges of some of the coupling lugs on the saw blade and the companion coupling notches of the saw body are arranged at one transverse angle relative to the plane of the saw body and blade, and the co-operating bevelled surfaces between other coupling lugs and notches incline transversely of the plane of the saw blade and body in the opposite direction and in the preferred construction the bevelled co-operating upright edges of the coupling lugs and notches incline alternately in opposite directions, thereby holding the blade in alinement with the saw body and preventing the blade from moving laterally away from either side of the saw body.

The upright front and rear edges of each coupling notch in the saw body are arranged at an oblique angle relative to the lower edge of the saw body, and preferably at an angle of 45 degrees, and the upright edges of each of the coupling lugs of the saw blade is correspondingly inclined at an oblique angle and engages with the oblique angled upright edges of the companion coupling notch on the saw body.

Due to this angular formation of the upright edges of the several coupling notches on the saw body and the correspondingly oblique angled upright edges on the coupling lugs of the saw blade which engage with the oblique angled edges of the notches on the saw body, the saw blade is supported on the saw body throughout its entire length and thus maintains all parts of the blade in proper engagement with the saw body so that the operation of sawing an article can be accomplished as effectively and as reliably as if the blade and saw body were made in one piece.

In order to prevent the coupling lugs of the saw blade from being drawn too tight into the coupling notches of the saw body stop lugs 20 are provided each of which engages with a stop notch 21 in the lower edge of the saw body and each stop lug is provided on its rear upright edge with a stop face 22 which is arranged at right angles to the plane of the blade and engages with a corresponding stop face 23 on the upright rear edge of the respective stop notch, as shown in Figs. 2 and 3.

Each of these stop lugs is provided with a beveled upper edge 24 and as shown in Figs. 8 and 9 which engages with a correspondingly bevelled edge 25 at the top of the respective notch in the saw body, as shown in the same figures. The engagement at the upper ends of the stop lugs and the upper ends of the respective stop notches incline alternately in opposite directions relative to the plane of the saw body and blade and thereby hold the blade against lateral displacement relative to the saw body from either side thereof and insure a uniform cutting action of the saw.

Various means may be provided for drawing the saw blade upwardly and holding the inclined surfaces of the blade relatively in engagement with the corresponding surfaces on the saw body, but those shown in the drawings have been found satisfactory in practice and are constructed as follows:

In Figs. 1 and 2 the several coupling lugs and stop lugs are provided with oblique inclined supporting surfaces on their upright edges which incline toward the rear end of the saw, and these lugs are retained in firm engagement with the correspondingly inclined edges of the notches in the saw blade by maintaining a rearward pull on this blade.

The means for effecting this pull are so constructed that the blade can be readily detached from the saw body and replaced by another when it is desired to change the character of the blade to suit some particular work as well as enabling a dull saw blade to be quickly replaced by a sharp one when this becomes necessary.

The preferred means which are employed for thus detachably connecting the saw blade with the saw body comprise an upwardly projecting hook 26 arranged at the rear end of the saw blade and screw means for drawing the blade backwardly including a tightening screw 27 arranged below the handle of the saw in a forwardly inclined position and provided at its front end with a cross pin 28 which engages with the hook 26 of the saw blade. In rear of this hook and pin the tightening screw 27 is slideable lengthwise in a guide eye 29 which is secured by means of a bracket 30 to the lower rear part of the saw blade. The screw 27 is drawn rearwardly together with the saw blade attached thereto by means of a screw nut 31 having threaded engagement with the rear part of the screw and bearing against the rear end of the guide eye 29 through the medium of one or more washers 32. After the blade has been firmly secured to the saw body loosening of the tightening screw is prevented by means of a clamping screw nut 33 applied to the screw and engaging with the rear side of this nut, as shown in Figs. 1, 4 and 5.

By arranging the tightening means for holding the saw body and blade in an assembled position at the rear end of the saw and underneath the handle the organization is a whole is rendered very compact and makes it possible to manipulate the saw as freely and easily as an ordinary standard saw without liability of interference with other parts while using the same.

These means for detachably mounting a saw blade on the body of a saw are not only extremely simple in construction but they are also capable of being readily operated for changing one blade for another and thus enabling a workman to select whatever kind of blade he requires and also permits of quickly replacing a dull blade with a sharp one and thereby avoid delay in the progress of the work in hand.

Moreover the blade is held reliably in engagement with the lower edge of the saw body throughout the entire length of the same and thereby insures perfect work of the blade throughout its entire stroke which otherwise would not be possible if the blade were only supported at its opposite ends and the intermediate part thereof were permitted to sag from the saw body.

I claim:

1. A saw comprising a body, a blade arranged below the body, and coupling means for detachably connecting said body and blade including a plurality of downwardly opening coupling notches formed in a longitudinally row on the lower edge of the body, and a plurality of upwardly projecting coupling lugs arranged in a longitudinal row on the upper edge of the body, and each lug of the blade engaging with a notch of the body, and the upright edges of the notches and lugs being inclined at an oblique angle lengthwise of the body and blade and the upright edges of each lug being bevelled and engaging with the correspondingly bevelled upright edges of one of the notches of the body, and the co-operating bevelled edges of the several lugs and notches being arranged at angles which extend alternately in opposite lateral directions relative to the plane of the body and blade, and said blade being provided on its upper edge with stop lugs which project into stop notches on the lower edge of said body, and said stop lugs having their upper ends bevelled and engaging with corresponding bevels on the upper edges of said stop notches, and the co-operating bevels of the several stop lugs and notches being inclined alternately laterally in opposite directions relative to the plane of the body and blade.

2. A saw comprising a body having a plurality of longitudinally inclined notches on its lower edge, a blade having a plurality of longitudinally inclined lugs arranged on its upper edge and engaging respectively with said notches, and means for moving said blade lengthwise of said body and maintaining said lugs and notches in engagement with one another including a hook arranged on one end of the blade, a tightening screw slidable lengthwise in a guide on the saw body and provided with a pin engaging with said hook, and a screw nut working on said screw and engaging said guide.

JACOB MILLER, Sr.

REFERENCES CITED

The following references are of record in the file of this patent:

UNITED STATES PATENTS

| Number | Name | Date |
|---|---|---|
| 62,813 | Brown | Mar. 12, 1867 |
| 381,811 | Peckover | Apr. 24, 1888 |
| 1,278,630 | Freas | Sept. 10, 1918 |
| 1,481,019 | Roe | Apr. 13, 1926 |